(12) United States Patent
Lin (10) Patent No.: US 9,395,755 B2
(45) Date of Patent: Jul. 19, 2016

(54) DOCK FOR CONTROLLING AND ADJUSTING VIEWING ANGLE OF ELECTRONIC DEVICES

(71) Applicant: HON HAI PRECISION INDUSTRY CO., LTD., New Taipei (TW)

(72) Inventor: Chia-Shih Lin, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/597,359

(22) Filed: Jan. 15, 2015

(65) Prior Publication Data

US 2015/0205329 A1 Jul. 23, 2015

(30) Foreign Application Priority Data

Jan. 22, 2014 (TW) .............................. 103102194 A (51) Int. Cl.
| | | |
|---|---|---|
| G06F 1/16 | (2006.01) | |
| F16M 11/04 | (2006.01) | |
| H04M 1/04 | (2006.01) | |

(52) U.S. Cl.
CPC ............. *G06F 1/1632* (2013.01); *F16M 11/04* (2013.01); *H04M 1/04* (2013.01)

(58) Field of Classification Search
CPC ... G06F 1/1632; G06F 1/1626; G06F 1/1616; G06F 1/1681; G06F 1/1679; G06F 1/162; G06F 1/1624; G06F 1/1643; G06F 1/166; G06F 1/183; G06F 1/1654; G06F 1/1658; G06F 1/187; G06F 3/0202; G06F 1/16; G06F 1/1601; G06F 1/1607; G06F 1/1613; G06F 1/1622; G06F 1/1667; G06F 1/1671; G06F 1/181; G06F 1/186; G06F 2200/1614; G06F 2200/1634; G06F 3/0208; G06F 3/0338; F16M 13/00; F16M 11/041; F16M 11/18; F16M 11/16; F16M 13/02; F16M 2200/041; F16M 11/04; F16M 11/06; F16M 11/125; F16M 11/2014; F16M 11/38; H04M 1/72544; B60R 11/0252; B60R 2011/0085; H05K 5/0204; H05K 5/0221; H05K 5/0247
USPC ............. 361/679.44, 679.43, 679.41, 679.01, 361/679.02, 679.26, 679.55–679.58, 361/679.21, 679.27, 679.4, 679.09, 679.3, 361/679.29, 679.38, 679.06, 679.33, 361/679.37, 752, 807, 679.04, 679.12, 759, 361/801–803, 810, 825; 248/292.14, 248/229.22, 81, 917, 919, 121, 122.1, 127, 248/176.1, 346.01, 80; 312/223.1, 223.2
See application file for complete search history.

(56) References Cited

U.S. PATENT DOCUMENTS

| | | | | | |
|---|---|---|---|---|---|
| 5,452,180 | A | * | 9/1995 | Register ................ | G06F 1/1632 361/679.44 |
| 5,619,397 | A | * | 4/1997 | Honda .................. | G06F 1/1632 361/679.43 |

(Continued)

FOREIGN PATENT DOCUMENTS

| | | |
|---|---|---|
| CN | 201994995 U | 9/2011 |
| TW | 404638 | 9/2000 |

*Primary Examiner* — Hung S Bui
*Assistant Examiner* — Michael Matey
(74) *Attorney, Agent, or Firm* — ScienBiziP, P.C.

(57) ABSTRACT

An electronic device dock for supporting an electronic device includes a dock body with a receiving space, a rotating gear, a switch, and a transmission member. The rotating head is received in the receiving space and rotatably connected to the dock body. The rotating gear is rotatably connected to the dock body and drives the rotating head to rotate relative to the dock body, to adjust a view angle of the electronic device. The switch is located in the dock body and is electrically connected to the electronic device when the electronic device is inserted into the rotating head. The transmission member is movably located in the dock body and is connected to the rotating gear. The transmission member being driven to move toward the switch and trigger the switch to control the electronic device when the rotating gear is rotated.

10 Claims, 10 Drawing Sheets

(56) References Cited

U.S. PATENT DOCUMENTS

| | | | | |
|---|---|---|---|---|
| 8,773,845 B2* | 7/2014 | Leung | ................... | G06F 1/1632 361/679.01 |
| 2005/0111182 A1* | 5/2005 | Lin | ................... | G06F 1/1632 361/679.41 |
| 2011/0170256 A1* | 7/2011 | Lee | ................... | G04G 17/086 361/679.44 |
| 2012/0188689 A1 | 7/2012 | Leung | | |
| 2015/0090852 A1* | 4/2015 | Lin | ................... | F16M 11/10 248/371 |

* cited by examiner

DOCK FOR CONTROLLING AND ADJUSTING VIEWING ANGLE OF ELECTRONIC DEVICES

FIELD

The subject matter herein generally relates to docks, and more particularly to a dock for controlling and adjusting a viewing angle of electronic devices.

BACKGROUND

Portable devices have become popular, especially, portable devices such as tablets, phones with large screen and so on. Generally docks are used to support the portable devices at a preset viewing angle.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series and the like.

The present disclosure is described in relation to a dock 2000 which can adjust a viewing angle of electronic devices 1000.

Figure 1:
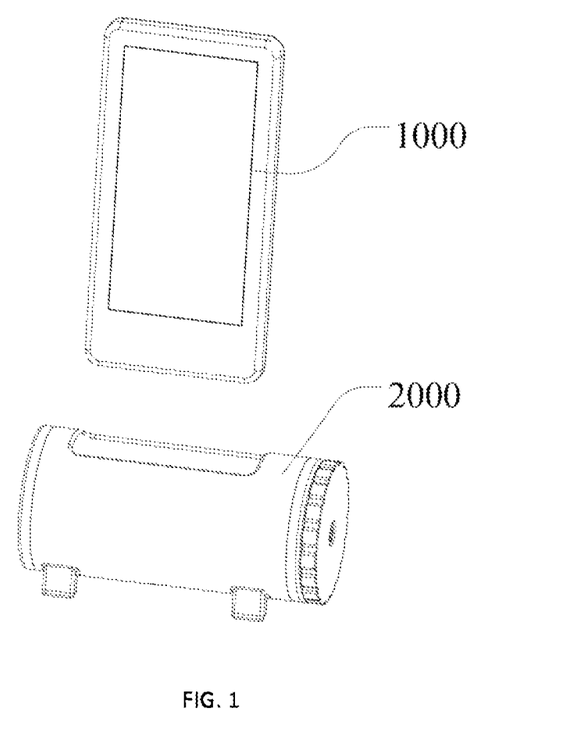
FIG. 1 is an assembled view of a dock and an electronic device.

FIG. 1 illustrates a view of an electronic device 1000 being installed to a dock 2000. The dock 2000 is operated to support an electronic device 1000 and to adjust a viewing angle of the electronic device 1000 and to control the electronic device 1000. The electronic device 1000 is configured with a screen, for example, the electronic device can be a tablet a smart phone or some other electronic device with a screen.

Figure 2:
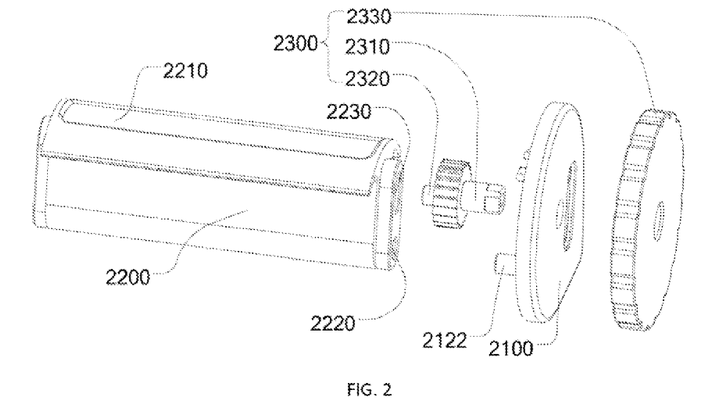
FIG. 2 is an exploded, isometric view of a rotating head and a rotating member of the dock of FIG. 1.
Figure 3:
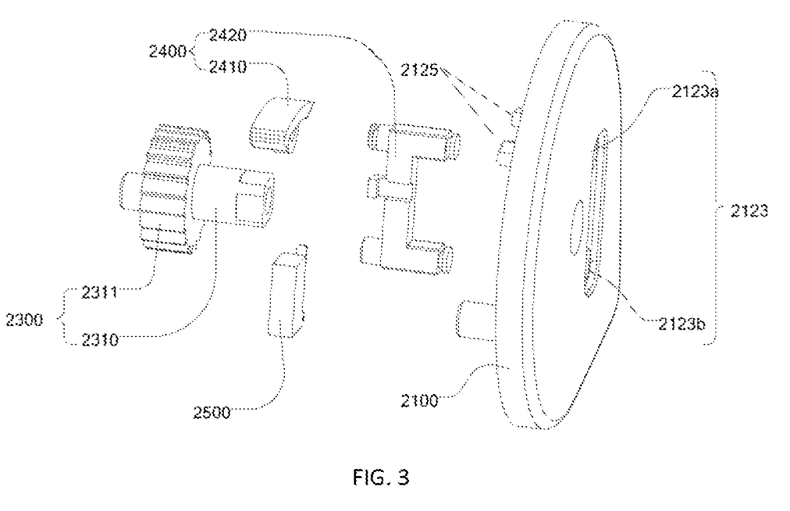
FIG. 3 is an exploded, isometric view of a transmission member, a switch, and the rotating member of the dock of FIG. 1.

FIG. 2 and FIG. 3 illustrate that the dock 2000 includes a dock body 2100, a rotating head 2200, a transmission member 2400, a rotating gear 2300 and a switch 2500. The rotating gear 2300 is rotatably connected to the dock body 2100. The rotating head 2200 is used for supporting the electronic device 1000, the rotating head 2200 is received in the dock body 2100 and is rotatably connected to the rotating gear 2300, and therefore, the rotating head 2200 can be rotated by manually rotating the rotating gear 2300. The switch 2500 is located on the dock body 2100 and can be electrically connected to the electronic device 1000, the switch 2500 is operated to control the electronic device 1000, for example, the switch 2500 may control the electronic device 1000 to lock a screen, pause a video, answer the phone, and so on. In the embodiment, the switch 2500 may be an inductive switch, an optoelectronic switch, or a mechanical switch. The transmission member 2400 is movably located in the dock body 2100 for triggering the switch 2500.

Figure 4:
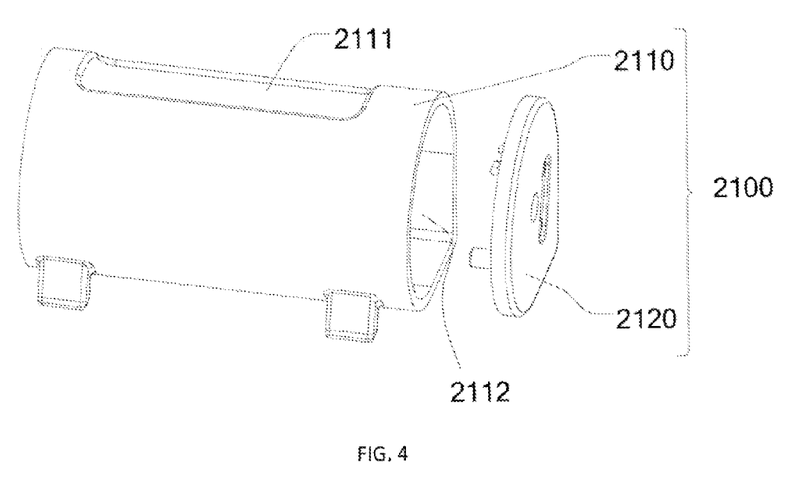
FIG. 4 is an isometric view of a dock body of the dock of FIG. 1.
Figure 5:
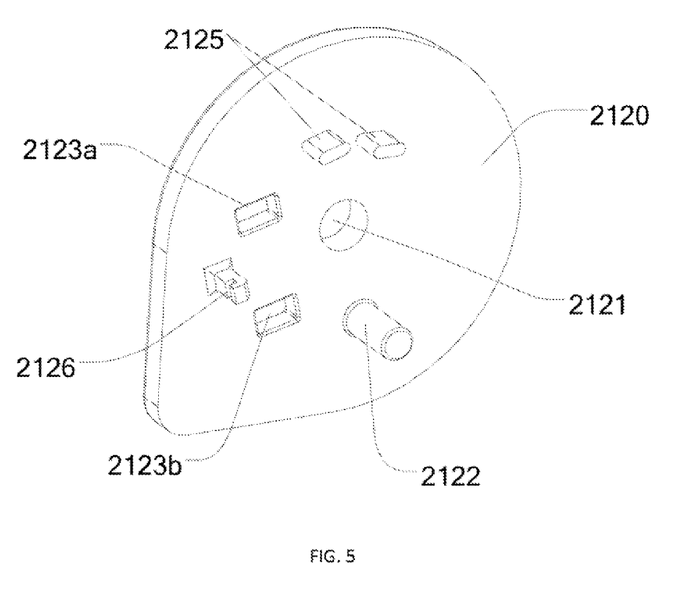
FIG. 5 is an isometric view of a cover of the dock body of FIG. 4.

FIG. 4 illustrates that the dock body 2100 includes a housing 2110 and a cover 2120. In the embodiment, the dock body 2100 is columned shaped, and one end of the dock body 2100 is designed as a cover 2120, which is detachably connected to the remaining dock body 2100 which acts as the housing 2110. The housing 2110 defines a slot 2111 and a receiving space 2112 for receiving other elements of the dock 2000; the electronic device 1000 is inserted into the rotating head 2200 from the slot 2111. FIG. 5 illustrates that the cover 2120 defines a through hole 2121 for installing the rotating gear 2300, a slide-rail 2123 for installing the transmission member 2400, a first shaft 2122, a first connecting block 2126, and a limiting block 2125. In the embodiment, the slide-rail 2123 includes a first slide-rail 2123a and a second slide-rail 2123b, the first slide-rail 2123a is parallel with the second slide-rail 2123b, the first slide-rail 2123a and the second slide-rail 2123b are both rectangular shaped.

Figure 6:
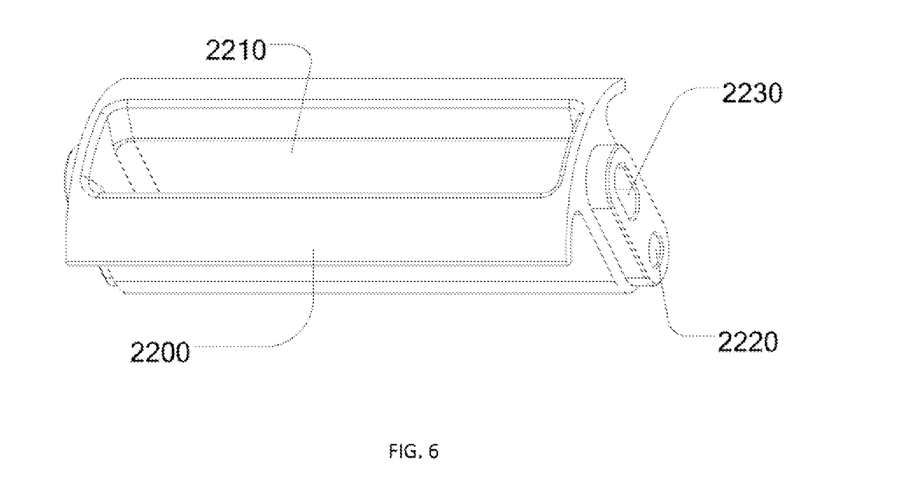
FIG. 6 is an isometric view of the rotating head of FIG. 2.

FIG. 6 illustrates that the rotating head 2200 defines an opening 2210, a slide-recess 2230, and a first shaft hole 2220. The electronic device 1000 is partially inserted into the opening 2210, a plug (not shown) is located in the opening 2210, when the electronic device 1000 is inserted into the opening 2210, the plug inserts into and electrically connects to the electronic device 1000 for transmitting data; in the embodiment, the plug is a micro USB plug. The first shaft hole 2220 is in circle shaped, the first shaft 2122 of the cover 2120 rotatably inserts into the first shaft hole 2220 to enable the rotating head 2200 to rotate relative to the cover 2120. The slide-recess 2230 is rectangular shaped.

Figure 7:
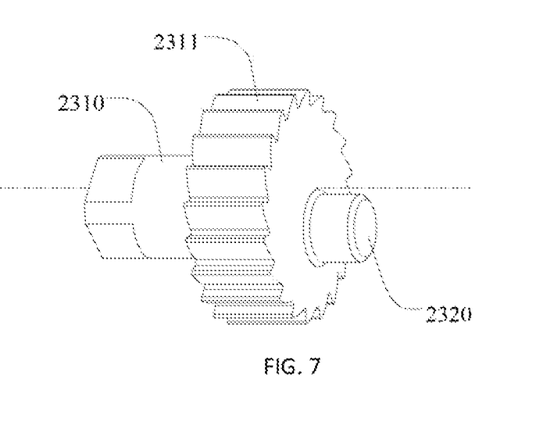
FIG. 7 is an isometric view of a rotating shaft of the rotating member of the FIG. 2.

FIG. 7 illustrates that the rotating gear 2300 includes teeth 2311, a rotating shaft 2310, an eccentric shaft 2320, and a knob 2330 (shown in FIG. 2). The teeth 2311 include two opposite surfaces. The rotating shaft 2310 is located on one surface, the eccentric shaft 2320 is located on the opposite surface, and the rotating shaft 2310 and eccentric shaft 2320 are arranged in different lines and the rotating shaft 2310 acts as a pivot. The rotating shaft 2310 passes through the through hole 2121 installing the rotating gear 2300 rotatably on a first surface of the cover 2120 facing the receiving space 2112.

The eccentric shaft 2320 is rotatably inserted into and slides along the slide-recess 2230. Therefore, when the teeth 2311 are manually rotated, the eccentric shaft 2320 is rotated around a line defined by the rotating shaft 2310, and the eccentric shaft 2320 rotates the rotating head 2200 within a range back and forth relative to the first shaft 2122. The knob 2330 is fixed to the rotating shaft 2310 facing a second surface of the cover 2120 opposite to the first surface; therefore, users can adjust the viewing angle of the electronic device 1000 by rotating the knob 2330.

Figure 8:
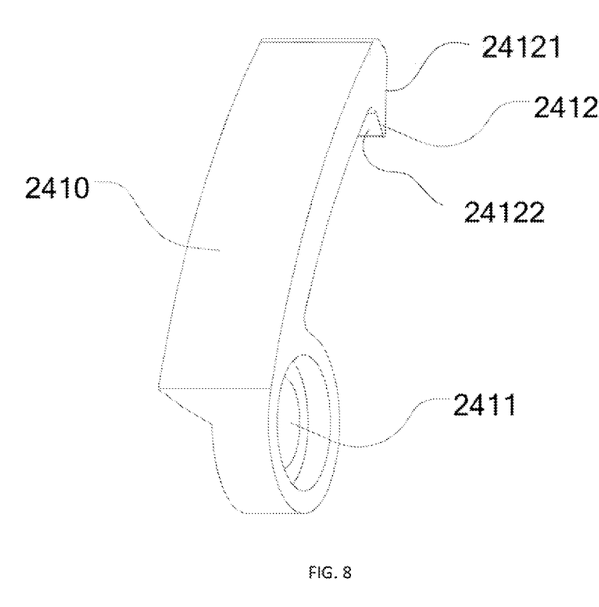
FIG. 8 is an isometric view of a transmission arm of the transmission member of FIG. 3.
Figure 9:
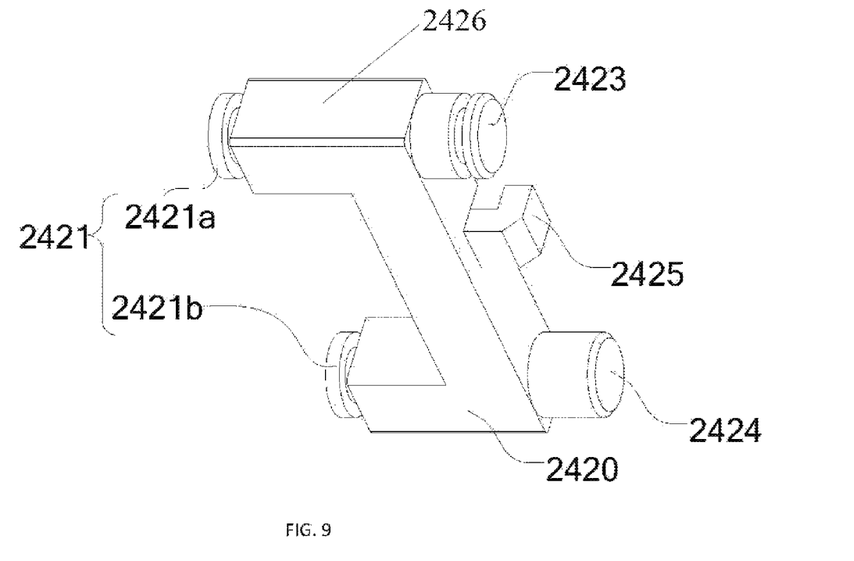
FIG. 9 is an isometric view of a trigger portion of the transmission member of FIG. 3.

FIG. 8 and FIG. 9 illustrate that the transmission member 2400 includes a transmission arm 2410 and a transmission body 2420. The transmission body 2420 includes a transmission base 2426, a slide-portion 2421, a connecting portion 2423, and a trigger portion 2424. The connecting portion 2423 protrudes from the transmission base 2426; the trigger portion 2424 protrudes from the transmission base 2426 parallel with the connecting portion 2423. The slide-portion 2421 protrudes from the transmission base 2426 extending away from the connecting portion 2423 and the trigger portion 2424; the slide-portion 2421 is slidably received in the slide-rail 2123 and is configured to slide along the slide-rail 2123. The connecting portion 2423 is rotatably connected to the transmission arm 2410. The trigger portion 2424 is used to trigger the switch 2500 when the transmission body 2420 is moved to a pre-set position. In the embodiment, the slide-portion 2421 includes a first slide protrusion 2421a and a second slide protrusion 2421b, the first slide protrusion 2421a and the second slide protrusion 2421b protrude from two ends of the transmission base 2426 respectively, and the first slide protrusion 2421a is parallel with the second slide protrusion 2421b, the first slide protrusion 2421a and the second slide protrusion 2421b are movably received in the first slide-rail 2123a and the second slide-rail 2123b, respectively. One end of the transmission arm 2410 defines a connecting hole 2411, the connecting portion 2423 passes through the connecting hole 2411 connecting the transmission arm 2410 rotatably to the transmission body 2420. The other end of the transmission arm 2410 is located between the limiting block 2125 and the teeth 2311, the limiting block 2125 limits a movement of the transmission arm 2410 to prevent the transmission arm 2410 from separating from the teeth 2311, the other end of the transmission arm 2410 is located with a hook 2412, the hook 2412 includes an inclined plane 24121 and a vertical plane 24122, when the teeth 2311 are rotated in a first direction, the vertical plane 24122 engages with the teeth of the teeth 2311 locking the transmission arm 2410 to the teeth 2311, the teeth 2311 drive the transmission arm 2410 to slide the transmission body 2420 along the slide-rail 2123. When the teeth 2311 are rotated in a second direction different from the first direction, the inclined plane 24121 engages with the teeth 2311 making the transmission arm 2410 release from the teeth 2311, that is, the transmission arm 2410 cannot be driven by the teeth 2311. A first connecting block 2126 is located on the transmission base 2426, a second connecting block 2425 is located on the first surface of the cover 2120, and an elastic piece 2430 is connected between the first connecting block 2126 and the second connecting block 2425. In the embodiment, the elastic piece 2430 is a spring.

Figure 10:
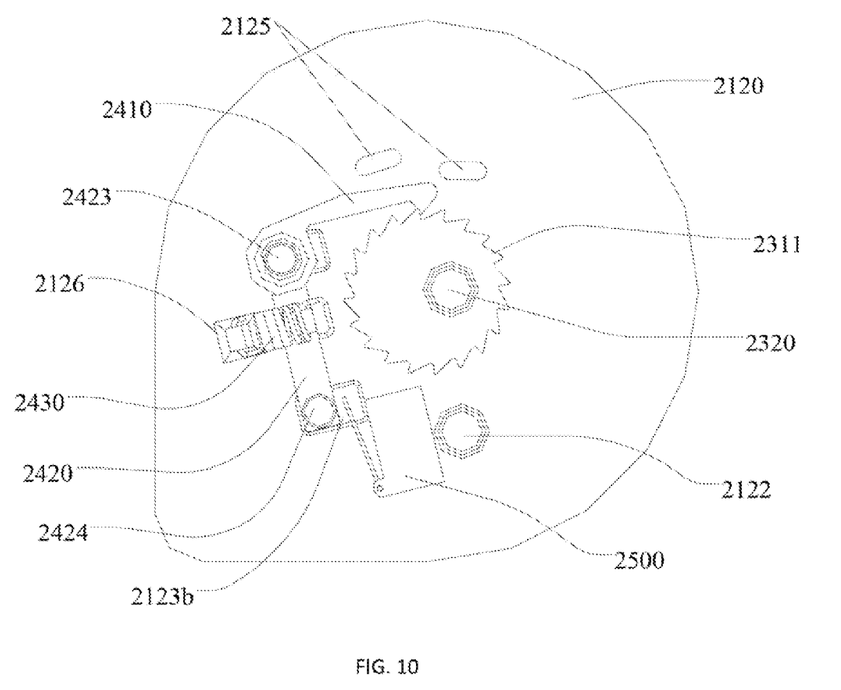
FIG. 10 is a side view of the dock of FIG. 1 without the dock body.

FIG. 10 illustrates when in use, one end of the slide-rail 2123 is defined as an initial position, and the other end as a final position, when users want to adjust the viewing angle of the electronic device 1000, the knob 2330 is rotated by a user in a clockwise direction, the teeth 2311 are rotated in a counterclockwise direction and engage with the inclined plane 24121, therefore, the transmission body 2420 will not be moved by the rotation of the teeth 2311, the eccentric shaft 2320 is rotated in a counterclockwise direction around the rotating shaft 2310 and slides along the slide-recess 2230 at the same time, therefore, the rotating head 2200 is rotated from front to back around the first shaft 2122 to adjust the viewing angle of the electronic device 1000. When the users want to rotate the electronic device 1000 to a new viewing angle, the knob 2330 is rotated in a counterclockwise direction, the teeth 2311 are rotated in a clockwise direction and engage with the vertical plane 24122, therefore, the teeth 2311 pull the transmission arm 2410 to move, and the transmission arm 2410 drives the transmission body 2420 to move along the slide-rail 2123 from the first position to the second position, at that time, the trigger portion 2424 touches the switch 2500 controlling the electronic device 1000 to lock the screen or pause the video and so on.

With the dock 2000 described above, the users can adjust the viewing angle of the electronic device 1000 or control the electronic device 1000 by rotating the knob 2330 in a different direction.

Many details are often found in the art such as the other features of a dock for controlling and adjusting viewing angle of electronic devices. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A dock for supporting an electronic device, comprising:
 a dock body with a receiving space;
 a rotating head received in the receiving space and being rotatably connected to the dock body, the rotating head supporting the electronic device;
 a rotating gear that is rotatably connected to the dock body, the rotating gear driving the rotating head to rotate relative to the dock body;
 a switch located in the dock body, the switch being electrically connected to the electronic device and being operated to control the electronic device to perform a predetermined function when the electronic device is inserted into the rotating head; and
 a transmission member movably located in the dock body and connected to the rotating gear, the transmission member being driven to move toward the switch to operate the switch when the rotating gear is rotated;
 wherein the rotating gear comprises a rotating shaft and an eccentric shaft which is on a different line with the rotating shaft, the rotating head comprises a slide-recess, the rotating shaft being rotatably connected to the dock body, the eccentric shaft being slidably received in the slide-recess, the eccentric shaft rotating around the rotating shaft and sliding within the slide-recess to drive the rotating head to rotate in order to adjust the view angle of the electronic device when the rotating shaft is rotated.

2. The dock of claim 1, wherein the transmission member comprises a transmission arm and a transmission body, the transmission body is movably connected to the dock body, the transmission arm is connected between the transmission body and the rotating gear, when the rotating gear is rotated in a first direction, the transmission arm is locked to the rotating gear, and the transmission arm is driven to pull the transmission body to move for triggering the switch.

3. The dock of claim 2, wherein when the rotating gear is rotated in a second direction different from the first direction, the transmission arm is released from the rotating gear, and the rotating gear drives the rotating head to rotate.

4. The dock of claim 3, wherein the rotating gear further comprises teeth, a hook is located on the transmission arm, the hook meshes with the teeth, when the teeth are rotated in the second direction, the teeth drive the transmission body to move for triggering the switch by the transmission arm.

5. The dock of claim 4, wherein the dock body comprises a housing defining the receiving space, the housing defines an opening, the electronic device is inserted into the rotating head from the opening.

6. The dock of claim 5, wherein the dock body further comprises a cover having a first surface facing the receiving space, the rotating head is rotatably connected to the first surface, the rotating gear is rotatably located on the first surface, the transmission arm is movably located on the first surface, and the switch is fixed on the first surface.

7. The dock of claim 6, wherein the cover defines a through hole, the rotating shaft passes through the through hole to allow the rotating gear to be rotatably connected to the cover, the rotating gear further comprises a knob fixed to the rotating shaft that faces a second surface opposite to the first surface of the cover.

8. The dock of claim 7, wherein the cover comprises a slide-rail, the transmission body comprises a slide portion engaged with the slide-rail, a connecting portion is rotatably connected to the transmission arm, and a trigger portion is operated to trigger the switch.

9. The dock of claim 8, wherein the transmission member further comprises an elastic piece, a first connecting block is located on the first surface of the cover, a second connecting block is located on the transmission body, the elastic piece is connected between the first connecting block and the second connecting block for making the transmission body separate from the switch.

10. The dock of claim 9, wherein a limiting block is located on the first surface and above the transmission arm, the limiting block prevents the transmission arm from separating from the rotating gear when the rotating gear is rotated.

* * * * *